Jan. 21, 1964  G. L. FASSETT ETAL  3,118,662
SEALING FIXTURE FOR GLASS BULBS
Filed Dec. 20, 1957  2 Sheets-Sheet 1

INVENTORS
RICHARD W. COX &
BY GARDNER L. FASSETT

William A. Zalesak
ATTORNEY

Jan. 21, 1964 G. L. FASSETT ETAL 3,118,662
SEALING FIXTURE FOR GLASS BULBS
Filed Dec. 20, 1957 2 Sheets-Sheet 2

INVENTORS
RICHARD W. COX &
BY GARDNER L. FASSETT
William A. Zalesak
ATTORNEY

United States Patent Office 3,118,662
Patented Jan. 21, 1964

3,118,662
SEALING FIXTURE FOR GLASS BULBS
Gardner L. Fassett and Richard W. Cox, Lancaster, Pa., assignors to Radio Corporation of America, a corporation of Delaware
Filed Dec. 20, 1957, Ser. No. 704,158
3 Claims. (Cl. 269—296)

This invention is directed to a fixture for holding glass parts during sealing. Specifically, the invention is directed to a fixture for holding the glass bulb and glass cap of a cathode ray tube in proper alignment, while these parts are being sealed together.

One type of cathode ray tube bulb is made up of a glass funnel member, to the large open end of which is sealed a glass cap member. The cap and funnel have matching edges, which can be fitted together and sealed by a glass joint. One method of fabricating a cathode ray tube involve the application of a phosphor coating to the inner surface of the glass cap before the glass cap is sealed to the open end of the funnel. This technique of bulb fabrication has been applied specifically to cathode ray tubes used as viewing picture tubes in color television, but it also has application to cathode ray tubes used for black and white television viewing and for other purposes.

To prevent deterioration of the phosphor coating during the sealing of the cap to the funnel portion, a low melting point glass frit is used to cement the cap portion to the funnel portion. In practice a thin layer of the glass frit is put down on the sealing edge of the glass funnel and then the glass cap is placed on the funnel with its sealing edge in alignment with the sealing edge of the glass funnel. The cap and funnel are thus supported and passed for several hours through an oven where the temperature is maintained at around 400° C. In the fabrication of a bulb in this manner, for use as a color television tube, it is desirable that the cap and funnel have a specific orientation relative to each other and that this orientation and alignment be maintained during the sealing operation. It is difficult to hold the glass portions together in alignment by such mechanical means as springs, latches, or external holding devices which are affected by changes in temperature and which will not compensate for the expansion and contraction of the glass parts during the sealing operation.

It is therefore an object of the invention to provide a novel fixture for holding glass parts in alignment during high temperature sealing operations.

It is another object of this invention to provide a novel sealing fixture for maintaining glass parts of a cathode ray tube bulb in alignment during sealing operations.

It is another object of the invention to provide a novel fixture for maintaining the alignment and orientation of the glass cap and glass funnel portions of a cathode ray tube bulb during sealing operations.

The invention is in a fixture for holding, orienting and supporting glass envelope parts in transit through a continuous oven, in which the envelope parts are sealed together. The fixture consists of a support member, for holding the glass bulb parts at an angle to the vertical and includes two support means, against which the funnel and cap rest by gravity. The orienting parts are non-symmetrically disposed relative to the tilt of the glass parts so that more of the weight of the glass parts is on one of the support means than on the other. This permits holding the glass parts against relative movement at one point and permitting movement relative to the support at the other point. The tilt of the bulb parts is such as to utilize the weight of the cap to aid in the sealing operation and yet to permit sufficient pressure of the parts against the orienting supports to maintain the alignment of the bulb parts during sealing.

FIG. 1 discloses a novel fixture in accordance with the invention.

Figures 1, 2:
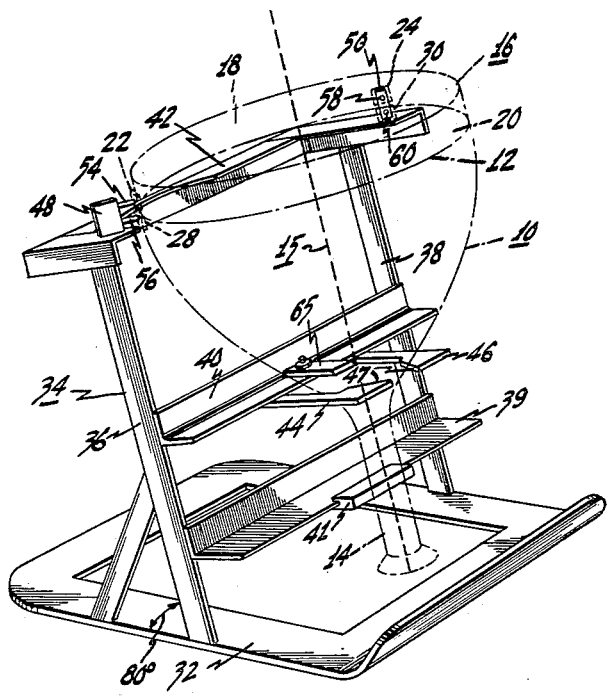
FIG. 2 is a partial plan view of the structure of FIG. 1, looking in direction A.

FIG. 1 shows in phantom a cathode ray tube bulb, which may be used for viewing a television picture, in color or black and white, as well as for other purposes. This bulb consists of a funnel 10 having a large opening 12 at one end and a glass tubular neck portion 14 sealed to the other end. To close the large end 12 of the funnel, a glass cap 16 is sealed to the funnel 10. The cap 16 comprises a substantially spherical plate portion 18 and a rim portion 20 encircling the periphery of the plate 18. The edge of the rim 20 is formed to match the open end 12 of the funnel 10. The matching edges of rim 20 and the end of funnel 12 are molded or ground flat, so that when the cap 16 is placed on funnel 10, a close fit is formed to aid in the sealing together of the cap and funnel. This forms a bulb having a longitudinal axis 15, which is coincident to the axes of cap 16 and funnel portion 10 respectively.

A glass frit or solder material having a low melting temperature at around 400° C. is used to join funnel 10 to cap 16. The glass frit is placed between the matching edges of rim 20 and funnel end 12. When the bulb parts are heated above the melting point of the glass frit, the glass frit will flow and adhere to the matching edges of the cap rim 20 and the funnel portion 12. The weight of the large glass cap 16 furnishes sufficient pressure to aid in forming a tight joint between the funnel and cap.

In the mass production of cathode ray tube bulbs fabricated from a cap and funnel portion, in the manner described, it is advantageous to utilize a long oven having a continuous belt passing through the oven. The bulb parts 10 and 16 are loaded onto fixture devices and positioned on the belt. The temperature of the oven is held at slightly more than 400° C. and the speed of the belt through the oven is sufficiently slow that the bulb parts remain within the oven for a period of several hours. It is desirable, in some types of tubes, to maintain the funnel and cap portions in accurate alignment and orientation as they are secured together by the glass seal. It is therefore necessary, in the sealing together of these bulb parts, to accurately hold this desired alignment, in spite of expansion of the fixture and of the glass parts and mechanical vibrations imparted to the glass parts during their trip through the oven.

Therefore, in accordance with the invention, a novel fixture, shown in FIG. 1, is provided to maintain the alignment and orientation of the bulb parts 10 and 16 while they are being sealed together. Bulbs, of this type, shown in phantom in FIG. 1, are used in the fabrication of color television tubes. A phosphor screen having a specific pattern is placed on the inner surface of the cap plate 18 before the cap is sealed to funnel 10. Also, mounted within the cap before sealing is an apertured mask electrode, not shown in FIGURE 1, but which is oriented accurately relative to the pattern of the phosphor screen. The completed cathode ray tube has an electron gun sealed within the neck portion 14 of the bulb in a predetermined orientation relative to the tube axis 15 so that the phosphor screen, the apertured mask and the electron gun have the proper angular orientation relative to each other to provide the correct functioning of the tube.

To determine the proper orientation of the electron gun when sealed into the neck 14, it is necessary that both the bulb and gun assembly be placed into the gun sealing machine with the desired orientation. For this purpose the cap 16 is provided on the outer surface of its rim 20 with an integral pad 22 having a V-groove therein and a flat pad 24, both of which extend beyond the surface of the rim 20. Grooved pad 22 and flat pad 24 are angularly separated 120° from each other about the central axis 15 of cap 16 which is normal to plate 18 (FIG. 2). Also, the glass funnel portion 10 has a pair of flat glass pads 28 and 30 formed as extensions from the surface of the rim portion 12. Pads 28 and 30 are also angularly displaced at 120° about the center axis 15 of the funnel portion 10. The pads 22, 24, 28 and 30 are accurately formed by the bulb manufacturer so that their surfaces are at predetermined distances from the center axis 15 of funnel 10.

The fixture shown in FIG. 1 is designed to hold the bulb parts 10 and 16 together and with their common axis 15 at an angle of 10° to the vertical. The fixture consists of a base plate 32 on which is mounted an agle iron frame 34 consisting of upright members 36 and 38 mounted at an angle of 10° to the vertical. Between members 36 and 38 is a lower cross-member 39, an intermediate cross member 40 and an upper U-shaped support 42, (FIGURES 1 and 2). Fixed to the lower cross member 39 is an asbestos composition pad 41 for supporting the bulb neck 14, when the funnel 10 is placed in the fixture. Fixed to the cross member 40 is a funnel support consisting of a pair of asbestos composition support arms 44 and 46. The outer ends of support arms 44 and 46 are tapered as shown at 47 so that they converge outwardly and form a wedge-shaped opening therebetween. Also, the outer ends of arms 44 and 46 are spaced sufficiently far apart to allow the neck portion 14 of the glass funnel 10 to be inserted therebetween.

The funnel 14 is positioned between arms 44 and 46 so that the smaller end of funnel 10 contacts the tapered portions 47 and is supported by them. The upper end of the funnel is supported by orienting support blocks 48 and 50 rigidly mounted on the upper cross piece 42. These orienting blocks 48 and 50 are offset different lateral distances from the only vertical plane 62 (FIG. 2) that includes the vertically inclined common axis 15 of the two parts (10 and 16) of the tube. In each of these orienting blocks, a pair of pins are mounted which extend radially inward in the direction of the common axis 15. Block 48 has two such parallelly arranged pins 54 and 56. Pin 56 is positioned to contact the flat pad 28 of funnel 10 and pin 54 is positioned to enter the V-groove of pad 22 of cap 16. In a similar manner, block 50, which is on the other side of the vertical plane 62, has a pair of parallel pins 58 and 60. Pins 58 and 60 are so positioned that pin 60 contacts flat pad 30 of the funnel 10 and pin 58 contacts the flat pad 24 of cap 16.

When the funnel 10 is supported between the arms 44 and 46, its neck 14 contacts pad 41 and the bulb is tilted from the vertical against pins 56 and 60, which contact pads 28 and 30 respectively. Prior to mounting the funnel 10 onto the fixture, the edge surface of the large end 12 of the funnel is coated with a low melting point glass frit. The glass cap is then placed onto the bulb 10 with the matching edge of rim 20 resting on the frit coated surface of funnel portion 12, so that pin 54 enters the V-groove of pad 22 in the cap rim, and pin 58 contacts pad 24 of the cap.

The surfaces of the ends of the pins 54, 56, 58 and 60 are all accurately formed and are positioned at the correct distance from the common axis of the funnel and cap. The bulb parts resting in the fixture, in the positions described, are thus accurately oriented relative to each other, since the pads and the V-groove are accurately formed and positioned relative to a predetermined arrangement to provide a desired angular orientation of the phosphor screen and mask within the cap relative to axis 15. Since the cap and funnel portions are thus maintained in this alignment and orientation as provided by the fixture, the electron gun is subsequently sealed within the neck 14 in a position relative to the same pads and V-groove to provide correct angular orientation of the gun with the mask and screen.

During the bulb sealing operation, it is important that the correct orientation and alignment of the cap 16 and funnel 10 is not disturbed. In accordance with the invention, the orienting block structure 48 is positioned at a different distance from the vertical plane containing the bulb axis 15, than is the orienting block 50. As shown in FIG. 2, the vertical plane through the axis 15 is indicated by the line 62 and it is readily seen that more of the weight of the cap and funnel will rest on the pins of block 48, when they are tilted against the positioning blocks 48 and 50.

This greater weight of the cap and funnel against the pins 56 and 54, respectively, is sufficient to prevent relative movement between these pins and the funnel and cap during the sealing operation. However, since the glass parts of the bulb and the metal parts of the fixture will expand and contract at different rates during the heating and cooling cycles with the oven, it is necessary to allow relative movement between these parts. This is permitted between the pads 24 and 30 and their respective supporting pins 58 and 60, since there is less pressure against these pins 58 and 60 than against the pins 54 and 56. Furthermore, the V-groove of pad 22 in cap 16 prevents, to a greater extent, relative movement between the cap and pin 54.

The frame 34 is tilted at an angle of 10° from the vertical, and although this angle is not limiting, it is that which has been found to be optimum for the size and weight of the glass bulbs used. This tilting of the frame is thus not only to hold the glass parts by gravity against the orienting blocks 48 and 50, but also to aid in the formation of a seal by permitting weight of the glass cap 16 to press the soft glass frit between the funnel and cap portions of the bulb sufficiently to form a good seal between these parts. The tilt of the bulb is that which provides sufficient pressure of the glass parts against orienting blocks 48 and 50, so that no relative movement is experienced between the glass parts and the orienting block 48 and yet permits relative movement between the glass parts and the orienting block 50. The weight of the glass parts against the tapering surfaces 47 of support arms 44 and 46 aid in wedging the glass funnel against its orienting support blocks 48 and 50 to further aid in preventing movement between the glass funnel and the supporting block 48.

In FIGURE 1 is shown a stop member 65 fixed to the center of the cross piece 40 and extending from cross piece 40 to a position near but not touching the funnel portion 10. This stop member prevents the bulb funnel and cap from pitching forward off of the arms 44 and 46, in the event neck 14 breaks off above support 41. Such breakage could cause damage to other bulbs and even jam the oven belt.

Figure 3:
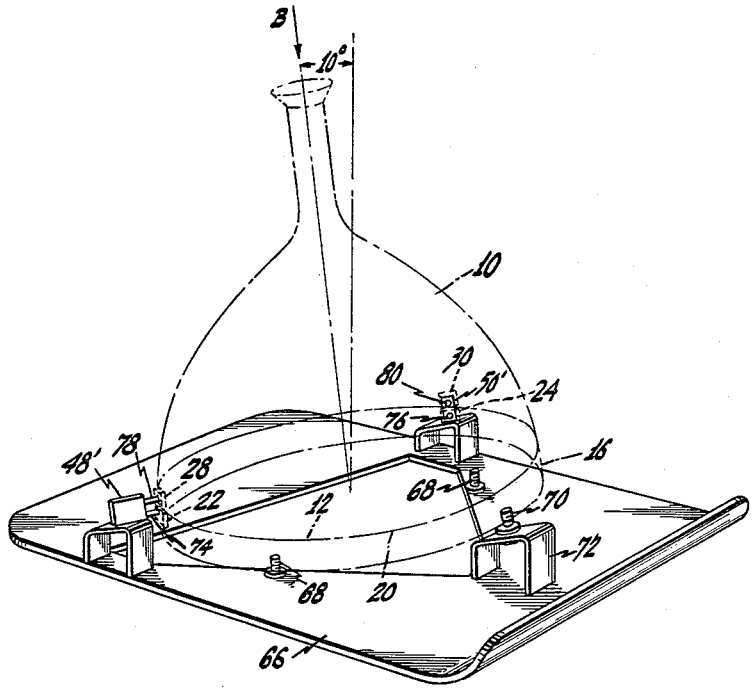
FIG. 3 is a view of an alternate form of the fixture in accordance with the invention.
Figure 4:
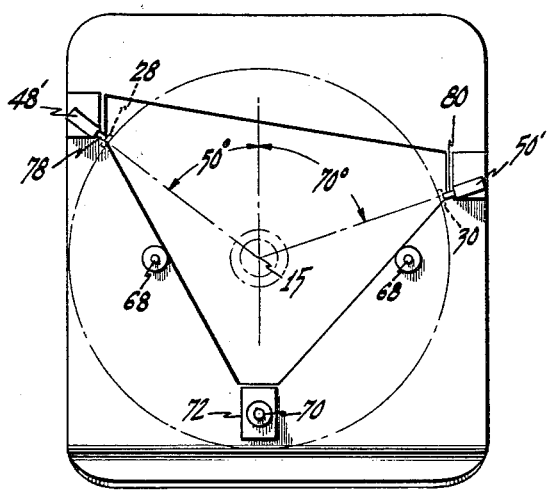
FIG. 4 is a partial plan view of the fixture of FIG. 3, looking in direction B.

FIGS. 3 and 4 show an alternate form of a fixture, in accordance with the invention, utilizing the same mode of support and orientation of the glass parts. The fixture of FIG. 3 consists of a base plate 66. Mounted on the base plate 66 is a frame comprising a pair of vertical support studs 68, and a third support stud 70, which is mounted on an upright support piece 72. The ends of the three studs 68 and 70 are positioned to lie in a plane forming an angle of substantially 10° with the horizontal. To load the fixture of FIG. 3, the cap portion 16 is placed on the ends of support studs 68 and 70. Due to the tilt of the plane of these studs, the cap will slide by gravity up against the orienting support blocks 48′ and 50′ corresponding to blocks 48 and 50 of the fixture of FIG. 1.

Block 48′ has a pin 74 for contacting the V-groove of pad 22 of the cap 16. Block 50′ has a pin 76 for contacting pad 24 of the cap 16. The funnel 10 is then placed on the edge of the cap rim 20 so that the frit coated edge portion 12 of the funnel 10 rests against the ground surface of the edge of rim 20. Block 48′ has an orienting pin 78 for contacting pad 28 of the bulb 10 and block 50′ has a pin 80 for contacting pad 30 of the funnel 10. The orienting pins 74, 76, 78 and 80 are formed and function in the manner described above in FIG. 1 to correctly align and hold the glass bulb parts in their proper angular orientation during sealing.

The sealing fixtures described above are those which do not require springs, latches or clamps or other external holding devices for maintaining proper alignment between glass parts during the sealing operation. Furthermore, the weight of the bulb and gravity are utilized to maintain orientation of the glass parts and yet to enable relative movement between the glass parts and the supporting fixture. The orienting pins described in the modifications of FIGS. 1 and 3, may be made of a graphite material, such as is known to be suitable for contacting hot glass. Also, the supporting arms 44 and 46, may be coated with a carbon or graphite material to permit a sliding contact with the glass funnel 10. The fixtures described, thus provide a device which can be easily loaded with glass parts and also transported through an oven on the continuous belt. The fixtures furthermore have no detrimental effects on the glass itself and are fabricated so that they can withstand temperatures of 500° C. if necessary. The metal parts may be made of a chrome-iron alloy because of the chemical stability of this metal at high temperatures and its resistance to oxidation. However, the fixture need not be limited to this material, as other appropriate materials may also be used.

It will be apparent to those versed in the art that the fixtures described herein can be easily adapted for sealing bulbs of different sizes and shapes than the one shown.

We claim:

1. A fixture for supporting the cap and bulb parts of a cathode-ray tube during the sealing together of said parts, said fixture comprising a frame, support means fixed to said frame, said support means including means for supporting said parts at an angle with respect to the vertical when said parts are placed in abutting relationship on said support means, said support means also including a pair of orienting structures fixed to said frame in positions offset laterally with respect to the common axis of said abutting parts of said tube and asymmetrically positioned with respect to the only vertical plane which includes said common axis, each of said orienting structures including a pair of stops against which correspondingly asymmetrically located outer surface areas of both the cap and bulb parts of said tube are caused to bear under the influence of gravity when said parts are placed in their said abutting relationship upon said support means.

2. A clampless fixture for supporting the cap and bulb parts of a cathode-ray tube in abutting relationship during the sealing together of said parts, said fixture comprising a frame, support means fixed to said frame, said support means including means for supporting said parts in abutting relationship with the common axis of said parts at an angle with respect to the vertical, said support means also including a pair of orienting structures fixed to said frame in positions offset laterally from said common axis and nonsymmetrically disposed with respect to the only vertical plane which includes said common axis, each of said orienting structures including a parallel pair of stops extending radially inward in the direction of said inclined axis and against which said tube-parts are respectively urged by the force of gravity when said parts are disposed in said abutting relationship on said support means with their common axis at said angle with respect to the vertical.

3. A fixture for supporting the cap and bulb parts of a cathode-ray tube during the sealing together of said parts, said fixture comprising a horizontal base, a frame member attached to said base and inclined from the vertical plane, a lower bulb-supporting means projecting from the outer side of said inclined frame, upper bulb and cap supporting means projecting from the outer side of said inclined frame and including a pair of aligning means for contacting the periphery of both the bulb and the cap, said aligning means being asymmetrically positioned with respect to a plane drawn normal to both the plane of said horizontal base and the inclined plane of said frame.

References Cited in the file of this patent

UNITED STATES PATENTS

| | | |
|---|---|---|
| 1,606,128 | Parker | Nov. 9, 1926 |
| 2,237,186 | Malloy | Apr. 1, 1941 |
| 2,474,708 | Westin | June 28, 1949 |
| 2,564,897 | Hahn | Aug. 21, 1951 |
| 2,677,920 | Danzin et al. | May 11, 1954 |
| 2,698,502 | Herzog | Jan. 4, 1955 |
| 2,719,386 | Johnson et al. | Oct. 4, 1955 |
| 2,847,699 | Mullan et al. | Aug. 19, 1958 |